United States Patent
Chang

[19]

[11] Patent Number: 6,016,216
[45] Date of Patent: Jan. 18, 2000

[54] POLARIZATION-INDEPENDENT ACOUSTO-OPTIC TUNABLE FILTER

[75] Inventor: I-Cheng Chang, Sunnyvale, Calif.

[73] Assignee: Aurora Photonics, Inc., Santa Clara, Calif.

[21] Appl. No.: 08/858,093

[22] Filed: May 17, 1997

[51] Int. Cl.[7] .................................. G02F 1/11; G02F 1/33
[52] U.S. Cl. ......................... 359/285; 359/286; 359/305; 359/308
[58] Field of Search ........................ 359/308, 310–314, 359/285, 286, 305; 356/349, 351, 359, 360

[56] References Cited

U.S. PATENT DOCUMENTS

| | | | |
|---|---|---|---|
| 4,699,466 | 10/1987 | Brandstetter et al. | 350/162.12 |
| 5,359,451 | 10/1994 | Gelbart et al. | 359/285 |
| 5,410,371 | 4/1995 | Lambert | 348/769 |
| 5,485,272 | 1/1996 | Dirksen et al. | 356/349 |
| 5,611,004 | 3/1997 | Chang et al. | 385/11 |

*Primary Examiner*—Georgia Epps
*Assistant Examiner*—Margaret Burke

[57] ABSTRACT

A polarization independent acousto-optic tunable filter (PIAOTF) used for multiwavelength switching and routing in wavelength division multiplexing (WDM) networks. In the PIAOTF an incident unpolarized light beam is divided to propagate and to be diffracted along two polarization division branches. By using polarization converters and equal optical paths for the two polarization division channels, a PIAOTF is created which minimizes polarization dependent loss and polarization mode dispersion. Furthermore, a preferred embodiment of the AOTF using an elongated acousto-optic interaction medium is described that provides the additional advantages of narrow bandwidth, lower drive power and easier alignment.

9 Claims, 3 Drawing Sheets

POLARIZATION-INDEPENDENT ACOUSTO-OPTIC TUNABLE FILTER

FIELD OF THE INVENTION

This invention relates to the field of acousto-optic (AO) devices and apparatus, and more particularly to electronically tunable optical filters utilizing AO interaction.

BACKGROUND OF THE INVENTION

Electronically tunable optical filters have been constructed so that an incident light beam of a first polarization is diffracted by an acoustic wave in a birefringent crystal into a second polarization for a selected bandpass of optical frequencies. The center wavelength of the passband of this type of filter is electronically tunable by changing the frequency of the acoustic wave within the crystal. A unique feature of such acousto-optic tunable filters (AOTFs) is that they are capable of selecting multiple passbands simultaneously and independently. As such, the AOTF is most promising for wavelength selective switching and routing in wavelength division multiplexing (WDM) networks.

Two basic types of AOTFs have been constructed: collinear and noncollinear. In the collinear AOTF, the incident and diffracted optical waves are collinear with the acoustic wave. The diffracted light beam at the selected passband is separated from the incident light beam by crossed polarizers. The collinear AOTF is disclosed in an article entitled "Acousto-Optic Tunable Filters," appearing on pages 744–747 in the June, 1969 issue of *The Journal of the Optical Society of America* (Vol. 59, No. 6), and in U.S. Pat. No. 3,679,288, entitled "Tunable Acousto-Optic Method and Apparatus."

In the noncollinear AOTF, the optical waves are noncollinear with the acoustic wave. The diffracted beam at the passband is selected from the incident light beam either by crossed polarizers or by spatial separation. The noncollinear AOTF is described in an article entitled "Noncollinear Acousto-Optic Filter with Large Angular Aperture," appearing on pages 370–372 of the Oct. 15, 1974 issue of the *Applied Physics Letters* (Vol. 25), and in U.S. Pat. No. 4,052,121 entitled "Noncollinear Tunable Acousto-Optic Filter." This type of noncollinear AOTF realizes a large angular aperture by choosing the tangents to the loci of the incident and diffracted light wavevectors to be parallel, a condition known as noncritical phase matching (NPM). Inside the crystal, the group velocity of the incident light beam is collinear with the diffracted light beam.

Another type of noncollinear AOTF known as the critical phase matching (CPM) type is described in U.S. Pat. No. 3,953,107. The CPM type noncollinear AOTF has a small angular aperture and must be used for a well-collimated light source. Inside the crystal of the CPM type AOTF, the incident light beam makes an angle with respect to the diffracted light beam.

Further efforts have been directed at improving the performance of noncollinear AOTFs. These include the use of external acoustic prisms as described in U.S. Pat. No. 4,685,772 entitled, "Tunable Acousto-Optic Filter with Improved Spectral Resolution and Increased Aperture," and the use of internal acoustic reflection as described in U.S. Pat. No. 4,720,177 entitled, "Tunable Acousto-Optic Filter Utilizing Internal Mode Conversion."

One drawback of the noncollinear AOTF is the limited interaction length caused by acoustic beam walkoff from the optical beam. A new type of noncollinear AOTF using an acoustically anisotropic medium is disclosed in an article entitled, "Collinear Beam Acousto-Optic Tunable Filter," appearing on pages 1255–1256 of the Jun. 18, 1992 issue of Electronic Letters (Vol. 28, No. 13) and in U.S. Pat. No. 5,329,397. In the collinear beam (CB) AOTF, the acoustic group velocity is chosen to be collinear with optical ray. This configuration extends the interaction length and achieves high spectral resolution and low drive power. The CBAOTF thus combines the advantages of both collinear and noncollinear type of AOTFs.

For use as a key WDM component in fiberoptic communication networks, the prior art AOTF is yet inadequate due to these basic limitations; insufficient resolution, high sidelobes, and in particular, polarization dependence. The operation characteristics of the AOTF are inherently sensitive to the polarization of the incident light since its operation is based on birefringent diffraction in an optical anisotropic medium.

A polarization independent (PI) AOTF can be constructed by using a polarization division configuration (PDC). In this configuration, the polarized input beam is divided by an input polarizing beam splitter (PBS) into two separate beams of orthogonal polarizations, these two beams pass through two AOTFs or a dual channel AOTF in two separate optical paths and are diffracted at the selected wavelengths. The two diffracted beams are then combined by an output PBS and appear as the filtered unpolarized beam. However, the prior art PIAOTF has severe performance limitations that include large polarization dependent loss (PDL), polarization mode dispersion (PMD), high coherent crosstalk and fabrication difficulties. This is explained with reference to FIG. 1, which shows diagramatically, a prior art PIAOTF as described in the aforementioned U.S. Pat. No. 5,329,397.

The PIAOTF is comprised of a PBS 11, a dual channel AOTF made of an optically birefringent crystal 12 and a PBS 13. A pair of acoustical transducers 14 and 15 are mounted in intimate contact with the birefringent crystal 12 and are connected to a suitable radio frequency generator 16, which may be two separately tuned voltage controlled oscillators (VCOs). The transducer launches a pair of first acoustic waves which are reflected from the output optical face 17 into a second pair of acoustic waves with phase velocity $V_p$ and group velocity $V_g$. The orientation of the optical face 17 is properly chosen so that the group velocity of the second acoustic wave $V_g$ is along the center axis of the birefringent crystal 12. An incident unpolarized optical beam 18 is split by the input PBS 11 into two separate beams of orthogonal polarizations, an o-ray 19 and an e-ray 20. The two beams are diffracted at the selected passband wavelength and transmitted out of the crystal as the filtered e-ray 21 and o-ray 22. The two diffracted light beams are recombined by the output PBS 13 into the filtered, unpolarized beam 23.

The prior art PIAOTF described above is deficient since the operation characteristics of the AOTF are asymmetrical for the incident o- and e-rays. This polarization asymmetry is true for all types of noncollinear AOTF. For instance, FIG. 2 of the above-cited U.S. Pat. No. 5,329,397 shows the driving acoustic frequency of the prior art AOTF as a function of the optical incidence angle $\theta_i$. For the same $\theta_i$, the frequencies $f_o$ and $f_e$ for the o- and e-rays are different. For operation with the same driving frequencies, different incidence angles for the o- and e-rays must be properly chosen. In practice, separate precision angular adjustment means are required. This greatly increases the construction complexity of the PIAOTF. Furthermore, due to the difference in angular and frequency characteristics for the o-ray and e-ray, the intensities of the filtered e-ray 21 and o-ray 22 in the two optical paths of the polarization division configuration are in general not equal. Thus, the prior art PIAOTF has a large polarization dependent loss (PDL).

Another deficiency of the prior art PIAOTF shown in FIG. 1 is the amplitude modulation due to coherent optical interference. A basic characteristic of AO interaction is that the optical frequency of the diffracted light is Doppler-shifted by the acoustic frequency $f_a$. The signs of the frequency shift for two co-propagating o- and e-rays are different, i.e. one upshift and one downshift in frequency. Referring to FIG. 1, when the two diffracted optical beams 21 and 22 are recombined by the output PBS 13, due to the finite leakage, the two diffracted beams with opposite Doppler shifts will interfere and result in large amplitude modulation at twice the acoustic frequency. For fiberoptic communication network applications, this coherent optical interference must be suppressed.

A further drawback of the prior art PIAOTF due to polarization asymmetry is the polarization mode dispersion (PMD) i.e., the polarization dependent group delay. It is shown in FIG. 1 that the prior art PIAOTF uses a co-planar PDC wherein the acoustic and optical beams for the two polarizations are in the same plane of AO interaction. Furthermore, the optical face 17 is slanted so that the reflected acoustic beam is collinear with the optic axis of the crystal. This results in different optical paths for the o- and e-rays. This difference in group delay for the two polarizations gives rise to a finite PMD, which will severely degrade the performance of the AOTF when used for wideband fiber optic communication applications.

The use of the slanted optical face 17 also causes a large deflection of the transmitted and diffracted beams. To correct the prism effect, an In-Line configuration is desired wherein the transmitted or diffracted light beam is aligned with the incident beam. The In-Line configuration provides the advantage of easy optical alignment and reduces the angular dispersion. Furthermore, the prior art AOTF uses a collinear beam configuration. Since the CBAOTF is comprised of an elongated crystal block, it can provide an extended optical path and thus realizes the high resolution required for WDM applications. However, it is also desirable to extend the In-Line elongated block configuration to the wider class of noncollinear AOTFs for additional advantages such as lower sidelobes.

From the above discussions, it is fair and accurate to state what is needed in the art and is not currently available is an AOTF that meets the requirements for use in WDM applications.

SUMMARY OF THE INVENTION

The primary objective is to describe preferred configurations of polarization independent (PI) AOTFs with the advantages of minimum polarization dependent loss (PDL) and polarization mode dispersion (PMD) as well as suppression of coherent optical interference effects.

Another objective of the present invention is to extend the PIAOTF configuration to a 2×2 polarization independent wavelength selective cross-connect.

It is also an objective of the present invention to provide an In-Line PIAOTF configuration with the advantages of easy alignment and simple construction.

It is yet another objective of the present invention to extend the In-Line configuration to general class of noncollinear AOTFs to achieve low sidelobes as well as high resolution.

A further objective of the present invention is to provide preferred configurations of polarization independent AO modulators using isotropic diffraction.

DETAILED DESCRIPTION OF THE PREFERRED EMBODIMENTS

Figure 2:
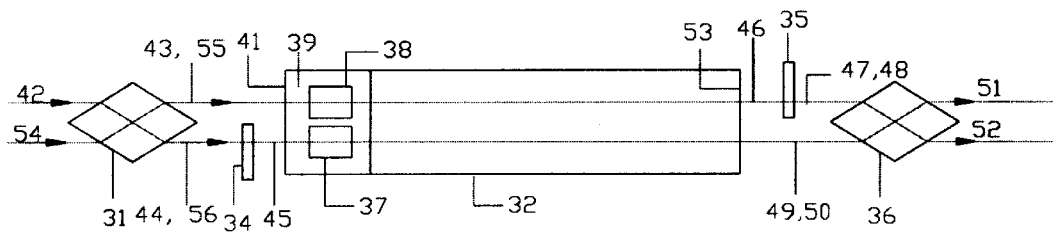
FIG. 2 is a schematic diagram of a PIAOTF in accordance with the present invention.
Figure 3:
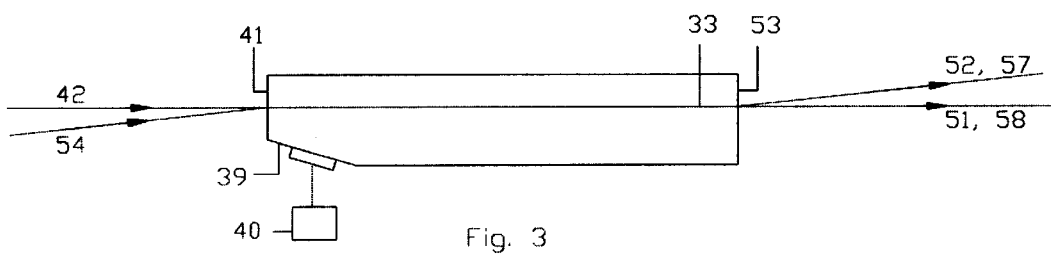
FIG. 3 is a top view of the PIAOTF shown in FIG. 2.

Referring to FIGS. 2–3, there is shown, diagramatically, a preferred embodiment of the PIAOTF in accordance with the present invention. The PIAOTF using a parallel polarization division configuration (PDC) is comprised of an input PBS 31, a dual channel In-Line AOTF made of an elongated birefringent crystal 32 with a central axis 33 chosen along a predetermined crystalline orientation, a pair of half-wave plates (HWPs) 34 and 35 which serve as polarization converters, and an output PBS 36. A pair of acoustical transducers 37 and 38 are mounted in intimate contact with the side face 39 of the birefringent crystal 32. The transducers 37 and 38 are connected to a suitable radio frequency (RF) generator 40, such as a voltage controlled oscillator (VCO), the frequency and amplitude of which can be varied. The transducers launch two primary acoustic waves with phase velocity $V_{p1}$ and group velocity $V_{g1}$. which are reflected from the optical face 41 and then converted to secondary acoustic waves with phase velocity $V_{p2}$ and group velocity $V_{g2}$, respectively. The normal of the optical face 41 is chosen to be along the center axis 33 of the birefringent crystal 32. An incident unpolarized optical beam 42 is divided by the PBS 31 into two separate beams of orthogonal polarizations, an ordinary (o) ray, 43 and an extraordinary (e) ray, 44. The e-ray 44 passes through the first HWP 34 and is then converted into an o-ray, 45. The two o-rays, 43 and 45, enter the optical face 41 of the birefringent crystal 32, and propagate along the crystal axis 33. When RF signals of the properly chosen frequency are applied to the transducers, the o-ray 43 for the corresponding wavelength is diffracted by the secondary acoustic wave in the AO crystal 32, then exits from the optical face 41 as a diffracted e-ray 46. The transmitted and diffracted beams 43 and 46 then pass through a second HWP 35 and are converted to a transmitted e-ray 47 and a diffracted o-ray 48. Likewise, the transmitted and diffracted parts of the o-ray 45 exited from the optical face 41 appear as a transmitted o-ray 49 and a diffracted e-ray 50. The two pairs of transmitted optical beams, e-ray 47 and o-ray 49, and diffracted o-ray 48 and e-ray 50, which are respectively parallel to each other, are combined by the output PBS 36 as the unpolarized transmitted and diffracted beams 51 and 52, respectively.

FIG. 3 shows, diagramatically, the top view of the dual channel In-Line AOTF shown in FIG. 2. This view shows the optical and acoustic beams in the AO interaction plane. The InLine AOTF provides a preferred polarization independent (PI) configuration for achieving increased resolution, reduced drive power and minimum polarization mode dispersion (PMD). As shown in the figure, the surface 39 onto which the transducers are bonded is chosen to be slanted, making a predetermined angle with the axis 33. The orientation of the side face 39 is properly chosen so that the acoustic wave generated upon reflection from the optical face 41 will be converted to a primary acoustic wave that propagates along a predetermined direction for the acousto-optic diffraction; for example, in a CB AOTF the group velocity of the primary acoustic wave reflected from the optical face 41 will be along the axis 33 of the elongated birefringent crystal 32.

Figure 1:
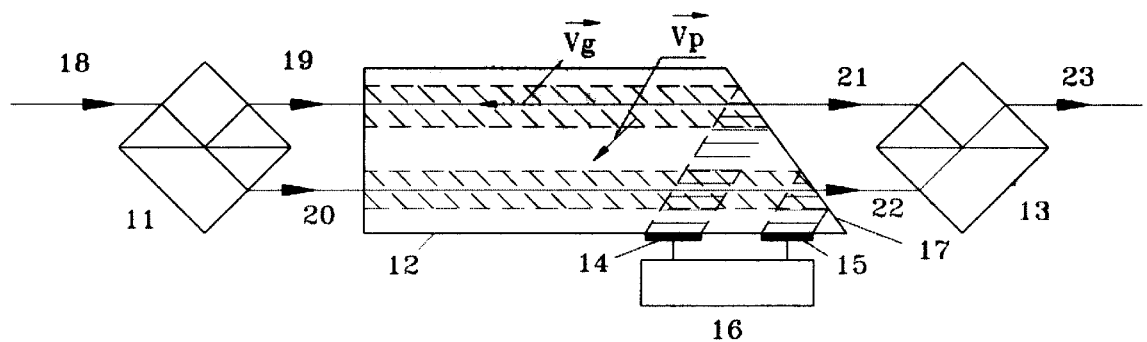
FIG. 1 is a schematic diagram of a PIAOTF according to the prior art.
Figure 4:
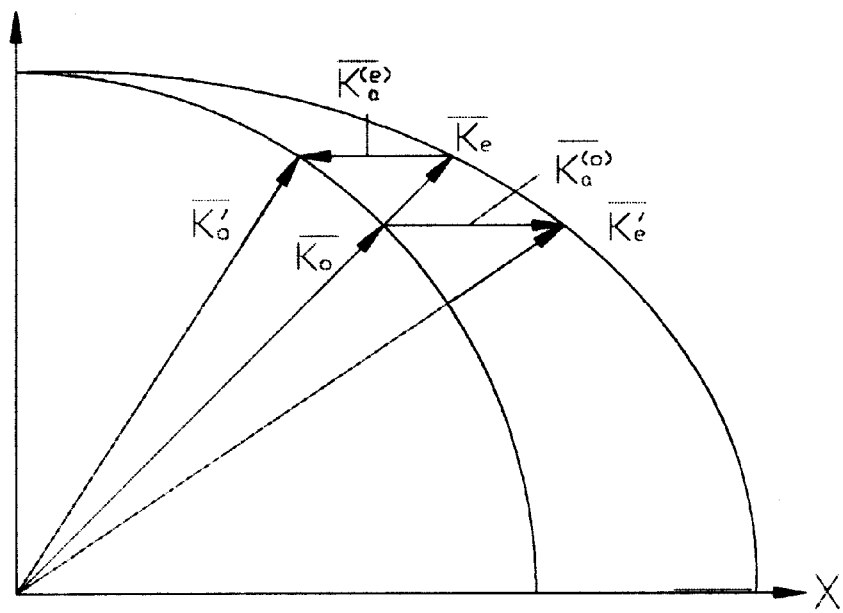
FIG. 4 is a wavevector diagram for AO interaction in a birefringent medium.

Compared to the prior art PIAOTF shown in FIG. 1, the PIAOTF in accordance with the present invention as shown in FIGS. 2–3 has the following significant features. First, the PIAOTF uses a polarization division configuration (PDC) that overcomes the basic performance limitations of being polarization dependent. This principle is illustrated as follows. Referring to FIG. 4, which shows the wavevector diagram for noncollinear AO interaction in a birefringent crystal, depending on the polarization of the incident light, the AO interaction is significantly different. An ordinary incident light beam, represented in the Figure by the incident ordinary (o) wavevector $k_o$ is diffracted by the acoustic wave $k_{ao}$ to a diffracted extraordinary (e) wave, $k_e'$. Likewise, the incident e-wave, $k_e$ by the acoustic wave $k_{ae}$, which is parallel to $k_{ao}$, to a diffracted wave $k_o'$. As shown in the Figure, the wavevector diagrams for the two polarizations are entirely different. The results are as follows: A) The magnitudes of the acoustic wavevectors $k_{ao}$ and $k_{ae}$ are different, thus the two AO diffractions occur at different acoustic frequencies, $f_o$ and $f_e$, respectively. B) The two acoustic wavevectors are in opposite directions. The corresponding frequency shifts for the optical waves are opposite, i.e., one upshift and the other downshift. C) The diffracted light for the two polarizations $k_e'$ and $k_o'$ are not parallel, making it practically impossible to recombine.

To overcome the polarization dependence resulting from the basic asymmetrical polarization characteristics of the AOTF, a HWP is used to convert the polarization of one of the optical beams exiting from the input PBS, e.g., the e-ray 44 into the orthogonal polarization o-ray 45 so that the two optical beams 43 and 45 incident to the AOTF have the same polarizations, i.e., both are o-rays. The AOTFs in the separate polarization division branches are operated in the same mode, i.e., the birefringent AO diffraction switching from ordinary to extraordinary polarization. The AO diffractions for the two separate optical branches of the AOTF occur at one acoustic frequency with the same diffraction angle and efficiency. The optical losses that occur in the two polarization division branches are equal and minimum PDL is thus obtainable. Furthermore, the frequency shifts of the two diffracted beams are equal and have the same sign. The critical problem of amplitude modulation of the prior art PIAOTF is also eliminated.

Second, unlike the coplanar PDC of the prior art, the PIAOTF of the present invention uses a dual channel PDC wherein the interaction acoustic and optical waves propagate in two parallel planes separated in the height direction of the AO crystal. The diffracted optical beams for the two separate channels are parallel to each other and travel along equal optical paths. Therefore, a negligible PMD is obtainable.

Figure 5:
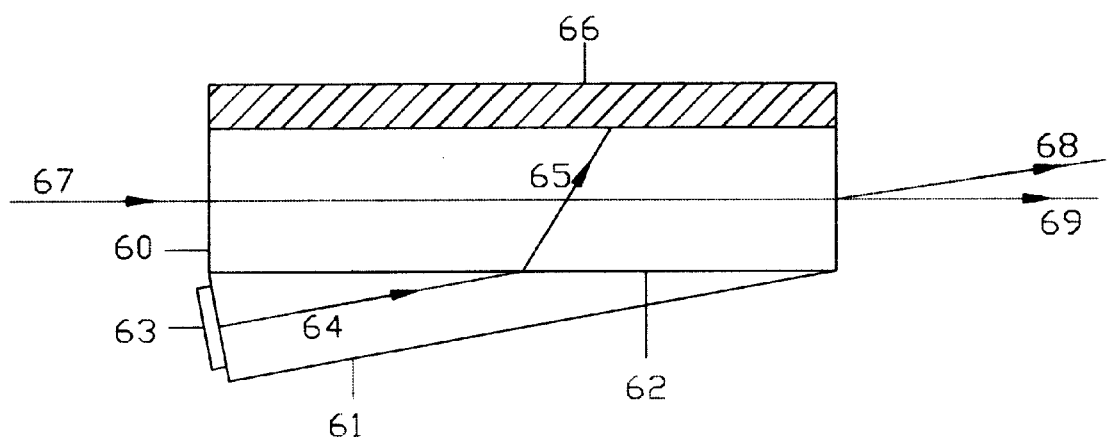
FIG. 5 is a schematic diagram of an embodiment of an in-line AOTF in accordance with the present invention.

Third, the preferred embodiment of the present invention shown in FIG. 5 uses an optical In-Line configuration wherein the optical faces are normal to the optical axis, i.e., the transmitted light beam is aligned with the incident light beam. The In-Line AOTF provides the advantage of easy optical alignment and reduces the angular dispersion. The conventional method for realizing an In-Line configuration is to use an external compensation prism to redirect the output optical ray so that it will align with the center axis. Since the AOTF crystal is birefringent, any small error in the orientation of the compensation prism will cause the optical beam to walk off from the optical axis. This greatly increases the difficulty of optical alignment for the AOTF and, consequently, the manufacturing cost. The use of a redirected wavefront for the first acoustic wave shown in FIG. 5 provides a simple and low cost method for realizing the In-Line configuration.

In the PIAOTF of the present invention, a pair of HWPs are used to convert the polarization of the optical beam. Strictly speaking, the HWP works as a polarization converter only at a single wavelength. Achromatic HWPs that operate over a relatively wide wavelength range can be constructed, for example, by using a combination of birefringent waveplates.

The embodiment of the In-Line AOTF is intended for collinear beam (CB) AOTFs. For the general case of the noncollinear AOTF, the use of an external acoustic prism to couple an acoustic wave at a glazing incidence is more suitable. FIG. 5 shows, schematically, a preferred embodiment of the In-Line AOTF in accordance with the present invention. The In-Line AOTF is comprised of an elongated birefringent crystal 60, and an acoustic prism 61 made of material with low acoustic velocity that is bonded to the side face 62 of the birefringent crystal 60. An acoustic transducer 63 is bonded to the acoustic prism 61 to generate an acoustic wave 64 in the acoustic prism 61 along a predetermined direction. The acoustic wave 64 is reflected at the side face 62 to generate a refracted acoustic wave 65 that travels in the birefringent crystal 60 and is terminated by an acoustic absorber 66. The direction of the acoustic wave 64 in the acoustic prism 61 is chosen so that the refracted acoustic wave 65 in the birefringent crystal 60 travels in the specified direction for the intended AO diffraction. An incident optical beam 67 is propagating along the center axis of the acoustic wave 65 and appears as a diffracted optical beam 68 and a transmitted optical beam 69.

The discussion of the PIAOTF is focused on its use as a tunable filter or as a 1×2 wavelength selective switch. The configuration can be extended to an add and drop filter or a 2×2 wavelength routing switch (WRS). Referring to FIGS. 2–3, a second unpolarized light beam 54 is incident onto the input PBS 31 in the direction perpendicular to the first unpolarized incident light beam 42. The input beam splits the second light beam 54 into two separate optical beams of orthogonal polarizations, an e-ray 55 and an o-ray 56 traveling along the upper and lower branches of the PDC, respectively; i.e., in each branch, the polarization of the second optical beam is opposite to that of the first optical beam. Referring to FIG. 3, there is shown the top view of the PIAOWRS. In this AO interaction plane, the second incident optical beam is chosen to be directed along the first diffracted light beam; i.e., the angle of incidence for the two incident beams onto the AOTF is arranged so that the two beams are diffracted into each other from a single acoustic wave. The second transmitted light beam 57 and diffracted light beam 58 are in the same direction of the first diffracted light beam 52 and transmitted light beam 51, respectively. The PIAOTF shown in FIGS. 2–3 thus acts as a 2×2 PIAOWRS.

The use of PDC to obtain polarization independence (PI) characteristics is not restricted to the AOTF based on birefringent AO interaction, it also applies to other types of AO devices that operate on isotropic diffraction. Consider, for example, an isotropic AO device driven by a longitudinal acoustic wave. For the isotropic AO interaction, the momentum matching condition and, consequently, the angular-frequency characteristics are independent of the input optical polarization. However, the diffraction efficiency of an AO interaction is proportional to the figure of merit $M_2 = n^6 p_{ij}^2 / \rho V^3$, where n is the refractive index, p is the density, V is the acoustic velocity and $p_{ij}$ is the relevant elasto-optic coefficient. For longitudinal AO cells, the magnitudes of the elasto-optic coefficients $p_{ij}$ for the two light polarizations are in general quite different. The figures of merit $M_2$ for the two polarizations are unequal and the AO diffraction efficiency depends critically on the input light polarization.

Figure 6:
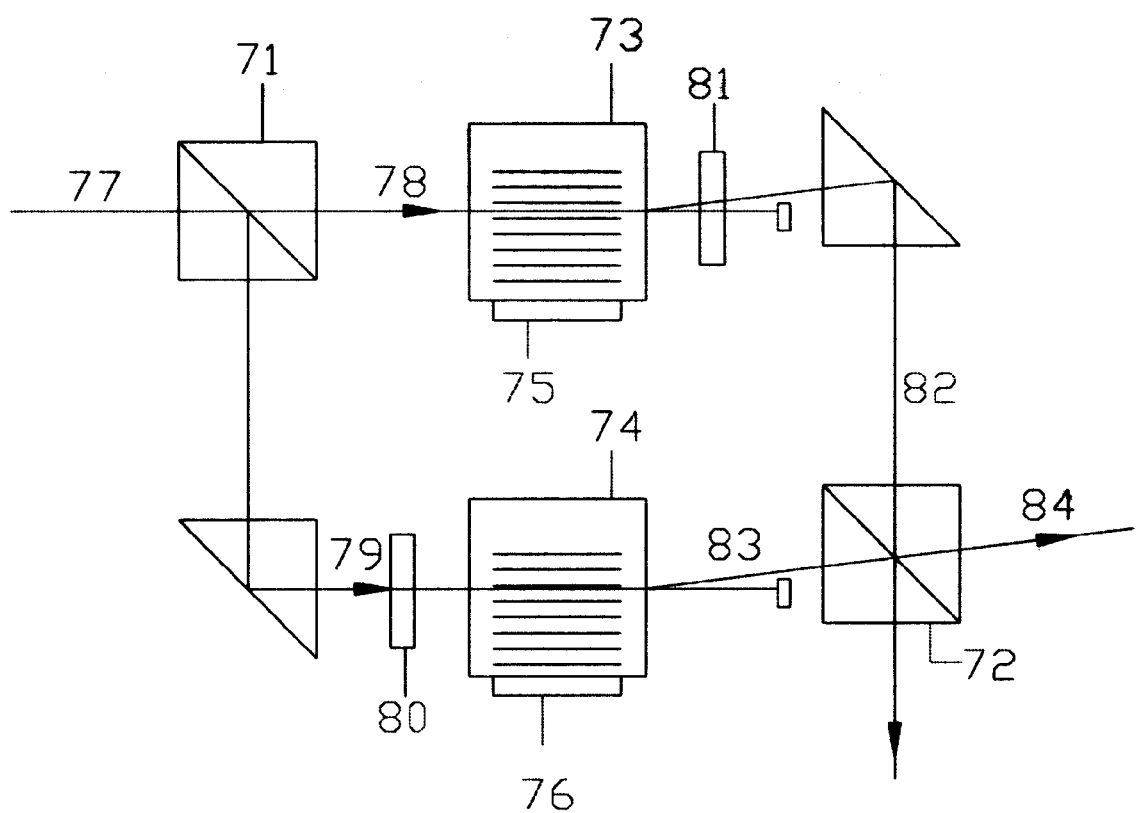
FIG. 6 is a schematic of a polarization independent AO modulator.

Polarization independent (PI) AO devices can be constructed, for example, using a parallel PDC. Referring to FIG. 6, therein is shown a PI AO modulator in accordance with the present invention.

The PI AO modulator is comprised of an input PBS 71, and output PBS 72, a pair of optical blocks 73 and 74 made of an AO material which can be either an isotropic or birefringent crystal or an amorphous solid. A pair of acoustic transducers 75 and 76 are bonded to the selected faces of the optical blocks 73 and 74, respectively. An unpolarized input beam 77 is divided by the input PBS 71 into an ordinary (o) ray 78 and an extraordinary (e) ray 79 which travel along two separate paths. A first HWP 80 is used in one of the paths so that both AO devices can be operated in the same mode. A second HWP 81 is used so that the diffracted optical beams, e-ray 82 and o-ray 83 are of orthogonal polarization. The output PBS 72 then recombines the two orthogonally polarized beams into a single unpolarized diffracted beam 84. The use of a polarization converter allows the AO devices in both branches of the PDC to be operated in the same mode of AO interaction where the AO figures of merit are maximum. Thus, the use of the PDC not only provides polarization independence, but may also increase the overall diffraction efficiency of the AO device.

I claim:

1. Apparatus for diffracting an incident light beam independent of the polarization of said incident light beam, comprising:
    a) an input polarizing beamsplitter means to separate said incident light beam into two orthogonally polarized light beams traveling along two separate optical branches;
    b) a first polarization converter means placed in one optical branch to cause the light beams in the separate optical branches to be the same polarization;
    c) acousto-optical devices means for diffracting said light beams of the same polarizations into two diffracted light beams; and
    d) a second polarization converter means placed in one of said optical branches to cause the diffracted light beams to be orthogonal polarizations; and
    e) an output polarizing beamsplitter means to recombine the two diffracted light beams of orthogonal polarization into a single diffracted light beam.

2. Apparatus as in claim 1 wherein said acousto-optic device is an acousto-optic tunable filter for diffracting an incident light beam at plural optical wavelengths, said filter comprising: an optically birefringent crystal, means for launching acoustic waves in said birefringent crystal to diffract said incident light beam to a diffracted light beam of orthogonal polarization at selected wavelengths.

3. Apparatus as in claim 1 and further including rearranging two input light beams through the input polarizing beamsplitter into two pairs of light beams of orthogonal polarization, means for directing the two pairs of light beams passing through each optical branch along predetermined directions so that the two pair of light beams diffract into each other and means for recombining the two pairs of output light beams in the two branches into two output light beams.

4. Method for diffracting an incident light beam independent of the polarization of said incident light beam, comprising:
    a) passing said incident light beam through polarizing beamsplitter means to separate said incident light beam into two orthogonally polarized light beams traveling along two separate optical branches;
    b) placing a first polarization converter means in one optical branch to cause the light beams in the separate optical branches to be the same polarization;
    c) passing said polarized light beams through an acousto-optical device for diffracting said light beams of the same polarization into two diffracted light beams;
    d) placing a second polarization converter in one of said optical branches to cause the two diffracted light beams to be orthogonal polarization; and
    e) passing through a second polarization beamsplitter means to recombine the diffracted light beams of orthogonal polarization into a single diffracted light beam.

5. Apparatus for diffracting an incident light beam independent of the polarization of said incident light beam, comprising:
    a) an input polarizing beamsplitter means to separate said incident light beam into two orthogonally polarized light beams traveling along two separate optical branches;
    b) a first polarization converter means placed in one optical branch to cause the light beams in the separate optical branches to be the same polarization; and
    c) acousto-optical devices means for diffracting said light beams of the same polarizations into two diffracted light beams.

6. Apparatus for diffracting light at plural optical wavelengths, said apparatus comprising:
    a) a noncollinear acousto-optic tunable filter comprising an optically birefringent crystal, means for directing an unpolarized incident light beam towards said filter, means for generating acoustic waves in said birefringent crystal to diffract a predetermined polarization component of said incident light beam to a diffracted light beam of orthogonal polarization along a different direction separated from the direction of said incident light; and
    b) polarization converter means placed in front of said birefringent crystal to select the polarization component of said incident light beam to be diffracted by said acoustic wave.

7. Apparatus as in claim 6 further including means for making said apparatus independent of the polarization of the incident light beam, said means comprising:
    a) an input polarizing beam splitter means to separate the incident light beam into two orthogonally polarized light beams; and
    b) passing the light beams through said acousto-optic tunable filter along two separate optical branches and placing said polarization converter in one of said optical branches prior to entering said acousto-optic tunable filter.

8. An acousto-optic tunable filter for diffracting an incident light beam to a diffracted light beam at plural optical wavelengths, said apparatus comprising:
   a) an elongated bar of acoustically anisotropic, optically birefringent crystal with a predetermined optical axis and an entrance face which is substantially perpendicular to the optical axis;
   b) means for passing an incident light beam through said entrance optical face; and
   c) acoustic prism means for abutting the side face of said elongated birefringent crystal substantially along said optic axis and means for generating and directing a secondary acoustic wave in said acoustic prism such that upon refraction at said side face of the birefringent crystal the secondary acoustic wave generates a primary acoustic wave in the birefringent crystal.

9. Apparatus as in claim 8 wherein the group velocity of said primary acoustic waves is substantially collinear with said incident light beam.

* * * * *